United States Patent
Reimondo et al.

(10) Patent No.: US 9,480,360 B2
(45) Date of Patent: Nov. 1, 2016

(54) DEVICE FOR PREPARING BEVERAGES AND RELATED PROCESS

(75) Inventors: Marino Reimondo, Turin (IT); Stefano Tornincasa, Turin (IT); Elvio Bonisoli, Turin (IT); Alfredo Vanni, Turin (IT); Alberto Cabilli, Turin (IT); Luca Bugnano, Turin (IT)

(73) Assignees: Luigi Lavazza S.p.A., Turin (IT); Politecnico di Torino, Turin (IT)

( * ) Notice: Subject to any disclaimer, the term of this patent is extended or adjusted under 35 U.S.C. 154(b) by 25 days.

(21) Appl. No.: 14/344,841

(22) PCT Filed: Sep. 7, 2012

(86) PCT No.: PCT/IB2012/054642
§ 371 (c)(1),
(2), (4) Date: Mar. 19, 2014

(87) PCT Pub. No.: WO2013/038318
PCT Pub. Date: Mar. 21, 2013

(65) Prior Publication Data
US 2015/0223630 A1     Aug. 13, 2015

(30) Foreign Application Priority Data
Sep. 14, 2011  (IT) ................ T02011A0819

(51) Int. Cl.
*A47J 31/40* (2006.01)
*A47J 31/36* (2006.01)
(52) U.S. Cl.
CPC .......... *A47J 31/407* (2013.01); *A47J 31/3633* (2013.01); *A47J 31/3638* (2013.01); *A47J 31/3676* (2013.01)
(58) Field of Classification Search
CPC ............ A47J 31/3633; A47J 31/3666; A47J 31/3676; A47J 31/368; A47J 31/369

USPC .................... 99/289 R, 295, 302 P
See application file for complete search history.

(56) References Cited

U.S. PATENT DOCUMENTS 5,454,293 A * 10/1995 Santi .................. A47J 31/0657
99/289 R
5,964,142 A * 10/1999 Tio ...................... A47J 31/3614
99/289 R
(Continued)

FOREIGN PATENT DOCUMENTS

| EP | 1 854 384 | 11/2007 |
| WO | WO 2007/110842 | 10/2007 |
| WO | WO 2011/015978 | 2/2011 |

OTHER PUBLICATIONS

WO 2007/016977 A1 (Bugger et al.) Feb. 2007.*
(Continued)

*Primary Examiner* — Reginald L Alexander
(74) *Attorney, Agent, or Firm* — Nixon & Vanderhye P.C.

(57) ABSTRACT

A device for preparing beverages, such as coffee, via a substance contained in a cartridge (C) comprises:—a supporting structure (3); and—a cartridge-holder moving element (10) having a distal cartridge-holder portion (12), the moving element (10) being supported on the supporting structure (3) for rotation about an axis (X10) between a first angular position and a second angular position and for translation with respect to said axis (X10) between a proximal position and a distal position. A link (18) is provided, such as an oscillating arm, which constrains the cartridge-holder moving element (10) and the supporting structure (3) so that the cartridge-holder moving element (10) is mobile between a condition of loading of the cartridge (C) and a condition of preparation of the beverage as a result of simultaneous movements of rotation and translation with respect to the aforesaid axis (X10).

9 Claims, 8 Drawing Sheets

(56) References Cited

U.S. PATENT DOCUMENTS

| | | |
|---|---|---|
| 6,779,436 B2 * | 8/2004 | Guindulain Vidondo ............... G07F 13/065 99/287 |
| 7,318,373 B2 * | 1/2008 | Blanc .................. A47J 31/3633 99/295 |
| 7,370,572 B2 * | 5/2008 | De'Longhi ......... A47J 31/3614 99/289 R |
| 7,487,713 B2 * | 2/2009 | Magno ................ A47J 31/3628 99/289 R |
| 7,571,674 B2 * | 8/2009 | Wang .................. A47J 31/3609 99/289 R |

OTHER PUBLICATIONS

International Search Report for PCT/IB2012/054642 mailed Dec. 14, 2012.

* cited by examiner

DEVICE FOR PREPARING BEVERAGES AND RELATED PROCESS

This application is the U.S. national phase of International Application No. PCT/IB2012/054642 filed 7 Sep. 2012 which designated the U.S. and claims priority to IT TO2011A000819 filed 14 Sep. 2011, the entire contents of each of which are hereby incorporated by reference.

TECHNICAL FIELD

The present description relates to devices for preparing beverages.

In various embodiments, the description may refer to devices for preparing beverages, such as for example coffee, via a substance contained in a cartridge.

TECHNOLOGICAL BACKGROUND

The devices for preparing beverages via a substance contained in a cartridge have for some time formed the subject of an intense activity of research, as witnessed, at the level of patent documentation, by documents such as EP-A-0 154 206, EP-A-0 407 365, EP-A-0 913 111, EP-A-1 208 782, EP-A-1 219 217, EP-A-1 980 183, WO-A-2005/115206, WO-A-2007/072453, WO-A-2008/046740, WO-A-2009/016444, and U.S. Pat. No. 4,681,028, or again the Italian patent application No. TO2009A001272.

The above solutions may present one or more of the following drawbacks:

- the passage from the condition of introduction of the cartridge to the condition of preparation of the beverage, brought about with a simple movement of translation, may render the operation of expulsion of the cartridge once used critical;
- the cartridge may get stuck during expulsion or not be expelled at all, with consequent impossibility of inserting a new cartridge in the device;
- the cartridge may accidentally drop in an undesirable way before or after it has been used;
- using in sequence movements of translation and rotation, discontinuities of movement may arise, with localized accelerations that are likely to give rise both to undesirable dropping of the cartridge from its seat and to phenomena of wear of the mechanism; and/or
- the device as a whole is complicated and hence, on the one hand, costly to produce, and on the other hand, sensitive to wear of parts and exposed to the possible creation of play between components or else to risks of sticking.

In various embodiments, the present description may refer to a device for preparing beverages as described in EP-A-1 854 384, taken as model for the preamble of claim 1.

OBJECT AND SUMMARY

The object of the present invention is to overcome the drawbacks outlined previously.

According to the invention, said object is achieved thanks to a device having the characteristics recalled in the ensuing claims. The invention also regards a corresponding method.

The claims form an integral part of the technical teaching provided herein in relation to the invention.

In various embodiments, it is possible to provide a device for preparing beverages, such as for example coffee, having one or more of the following advantages:

- passage between the condition of introduction of the cartridge and the condition of preparation of the beverage may be based, in either case, upon combined movements of translation and rotation, without any discontinuity, within a "soft" and regular range of movement;
- the device as a whole may be simple and economically advantageous to produce, does not present reasons for critical aspects linked to wear of parts and to the possible production of play between components, nor is it exposed to risks of sticking; and
- there do not exist appreciable risks of the cartridge getting stuck during expulsion or not being expelled.

BRIEF DESCRIPTION OF THE FIGURES

The invention will now be described, purely by way of non-limiting example, with reference to the annexed figures, wherein.

DETAILED DESCRIPTION

In the ensuing description, various specific details are illustrated aimed at an in-depth understanding of exemplary embodiments. The embodiments may be obtained without one or more of the specific details, or with other methods, components, materials, etc. In other cases, known structures, materials, or operations are not illustrated or described in detail so that the various aspects of the embodiments will not be obscured.

The reference to "an embodiment" or "one embodiment" in the context of the present description is intended to indicate that a particular configuration, structure, or characteristic described in relation to the embodiment is comprised in at least one embodiment. Hence, phrases such as "in an embodiment" or "in one embodiment" that may be present in different points of this description do not necessarily refer to one and the same embodiment. Moreover, particular conformations, structures, or characteristics may be combined in any adequate way in one or more embodiments.

The references provided herein are used merely for convenience and hence do not define the extent of protection or the scope of the embodiments.

In the figures, the reference number 1 designates as a whole a device (machine) for preparing beverages by means of a substance contained in a cartridge C. As used herein, the term "beverage" is to be understood as indicating in general any liquid alimentary product.

In various embodiments, the device 1 may be used, for example, for preparing beverages such as coffee (in particular, espresso coffee) starting from ground coffee contained in a cartridge C.

In various embodiments, the device 1 may include a base 2 of a supporting frame or casing 3 that may include, for example, two mutually facing metal plates 4 that support inside them the mechanism of movement of the cartridge C more fully described in what follows.

The reference number 5 designates an assembly that is to co-operate with the cartridge C in the preparation of a beverage.

In various embodiments, the assembly 5 may be mounted in a position inclined with respect to the frame 3.

In various embodiments, the assembly 5 may be an assembly for supplying water/steam, for example set in a fixed position on the frame 3 and able to introduce hot water/steam under pressure into the cartridge C so as to prepare a beverage by infusion; the beverage is then dispensed by the machine via ducts not explicitly illustrated in the figures.

In various embodiments, the water/steam may be introduced into the cartridge C by other ways while the cartridge C is applied against the assembly 5 that is to enable dispensing of the beverage.

In various embodiments, the assembly 5 may be connected to a heating device such as a boiler or heat exchanger (not expressly represented in the drawings).

The characteristics of the assembly 5 are hence open to a wide range of different embodiments according to the specific modalities of interaction with the cartridge C. These are in any case characteristics to be deemed known and hence such as not to require a detailed description herein, also because in themselves they may not be important for the purposes of understanding and implementation of what is described herein.

In this connection, it will be appreciated that the representation of the device 1 provided in the drawings is deliberately schematic in order to facilitate the description and understanding of the embodiments. The device 1 may consequently comprise various further components (outer casing, reservoir for the water, etc.) to be deemed known, here not taken into consideration in so far as they are not important for the purposes of understanding and implementation of the embodiments considered herein.

Various embodiments may stem as a whole from constructional solutions of the same type as the ones already illustrated in the document No. EP-A-1 854 384 described previously.

Figure 7:
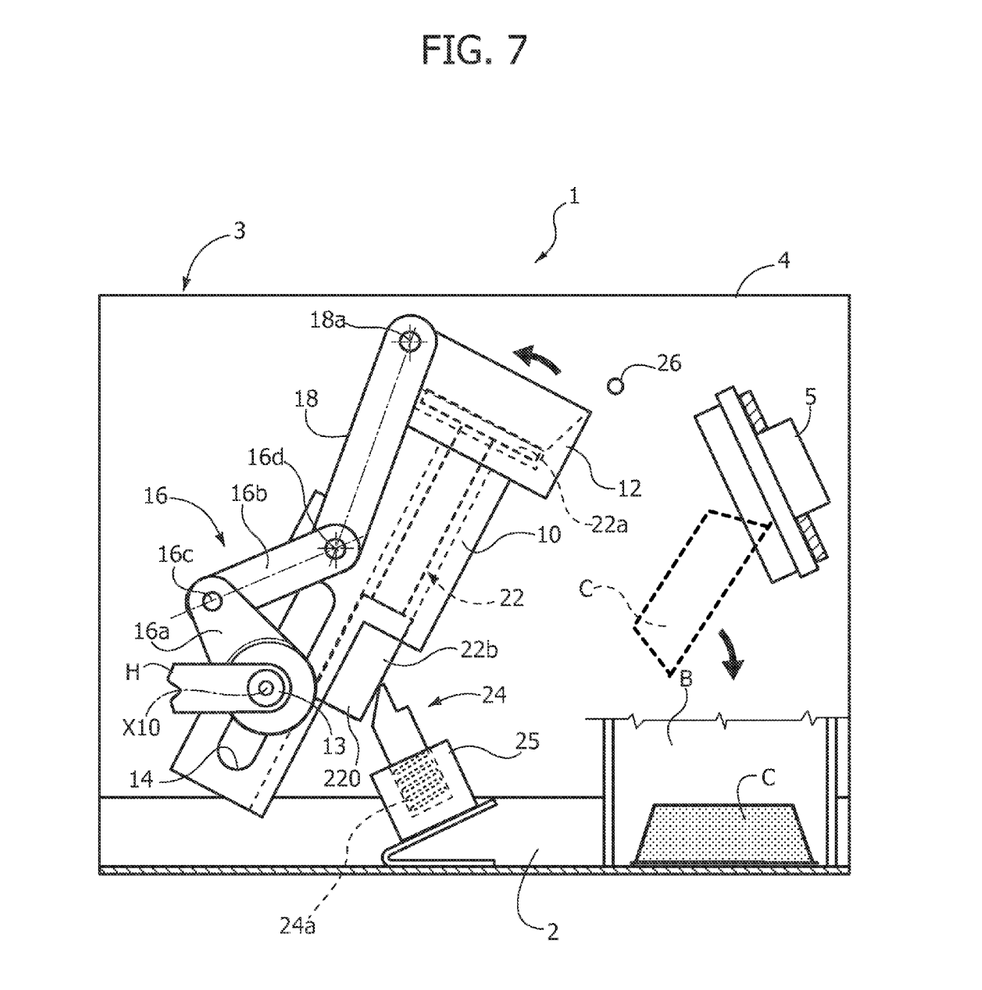

The frame 3 supports a mechanism, which, starting from a condition of loading of the cartridge C (schematically represented by FIG. 2), brings the cartridge C itself into a condition of preparation of the beverage (FIGS. 4 and 5) and then, once the cartridge has been used for preparing the beverage, returns from the condition of preparation of the beverage to the condition of loading, causing the cartridge used to be expelled from the machine, for example getting it to drop into a collection reservoir or container (FIG. 7).

In various embodiments, the aforesaid mechanism may comprise a moving element for supporting the cartridge C, designated by 10, which has a portion for receiving the cartridge C designated by 12 and located in a "distal" position with respect to the body of the moving element 10.

As used in the present description, the terms "distal" and "proximal" refer to the position of the assembly 5 that is to co-operate with the cartridge C for preparing the beverage (for example, coffee).

Consequently, "distal end" of the body of the moving element 10 will here be understood to mean the end where the portion 12 that is to receive the cartridge C is located, hence the end facing the assembly 5. "Proximal end" will be understood, instead, to mean the end of the moving element 10 opposite to the assembly 5.

Likewise, it will be said that during operation, the moving element 10 is subjected, in combination with a movement of rotation or oscillation (more fully described in what follows), to a to-and-fro movement of translation with respect to the assembly 5, i.e., forwards from a proximal position (set back with respect to the assembly 5) to a distal position (set forward with respect the assembly 5, with the cartridge C contained in the portion 12 set in conditions to co-operate with the assembly 5) and backwards from the distal position where it is set forward to the proximal position where it is set back.

Figure 1:
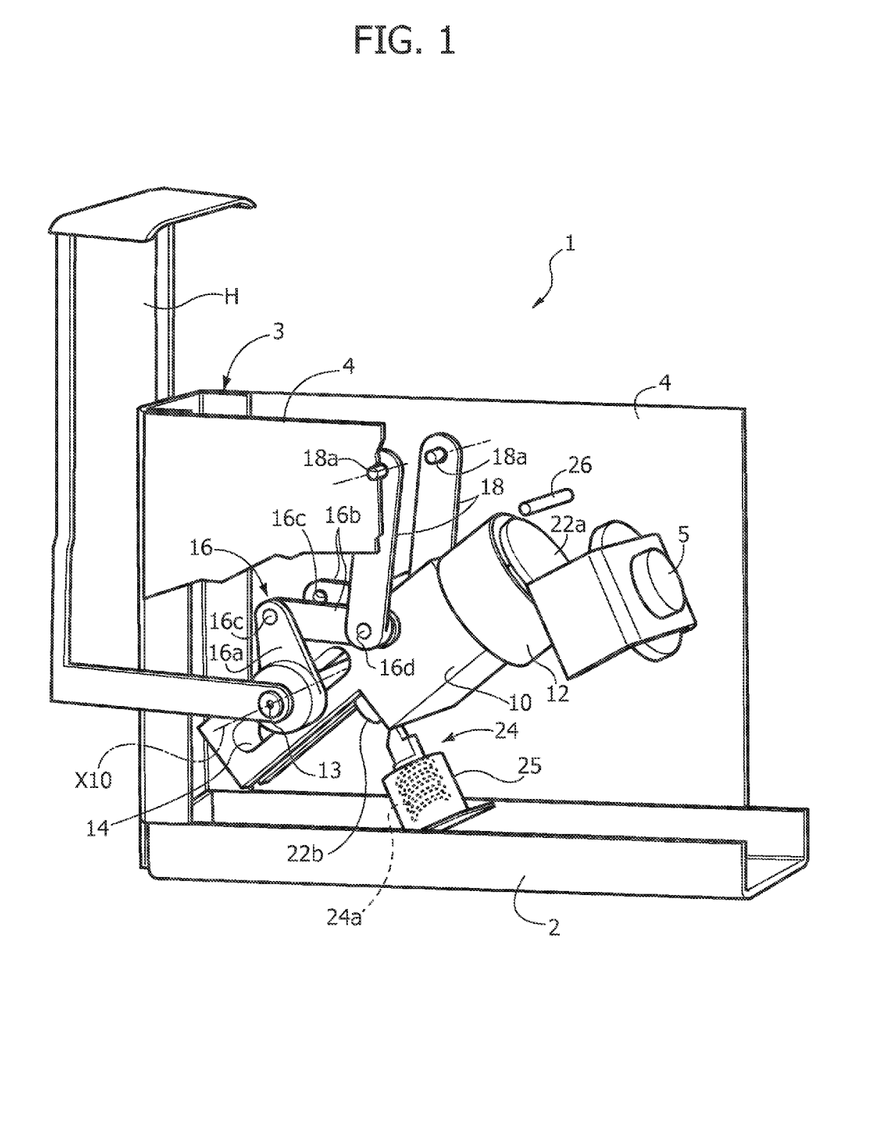
FIG. 1 is a schematic representation of an embodiment.
Figure 2:
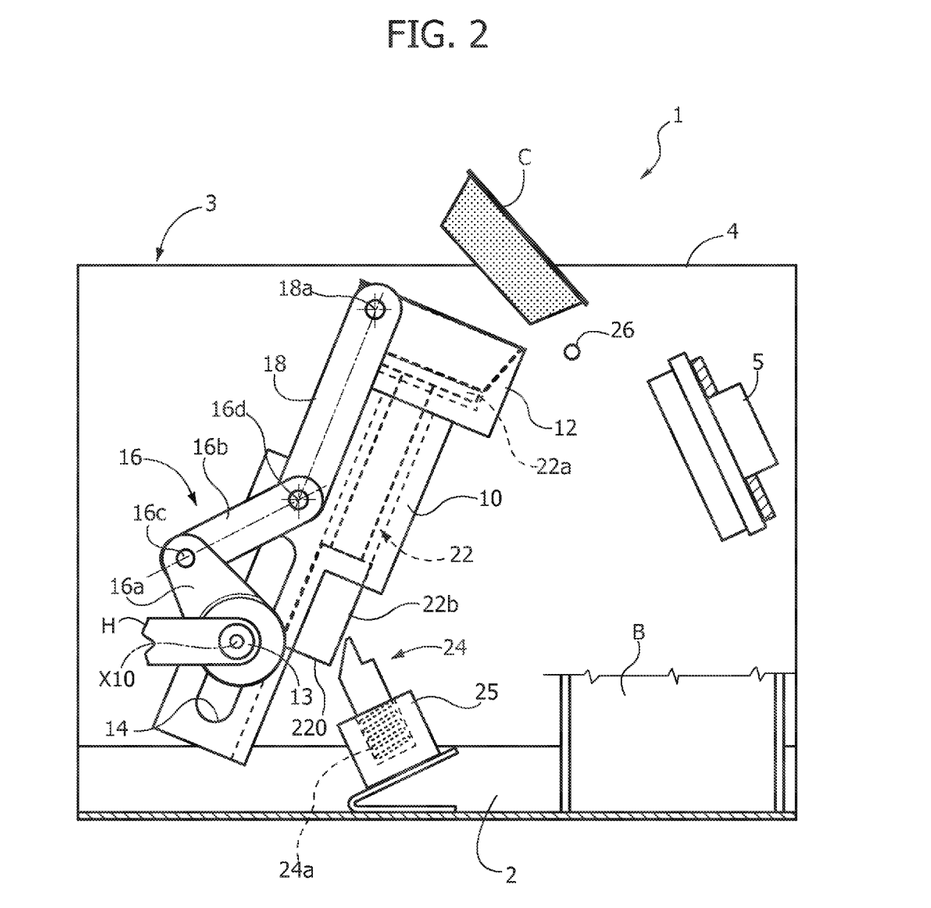
FIGS. 2 to 8 are schematic illustrations of various steps of operation of an embodiment.
Figure 3:
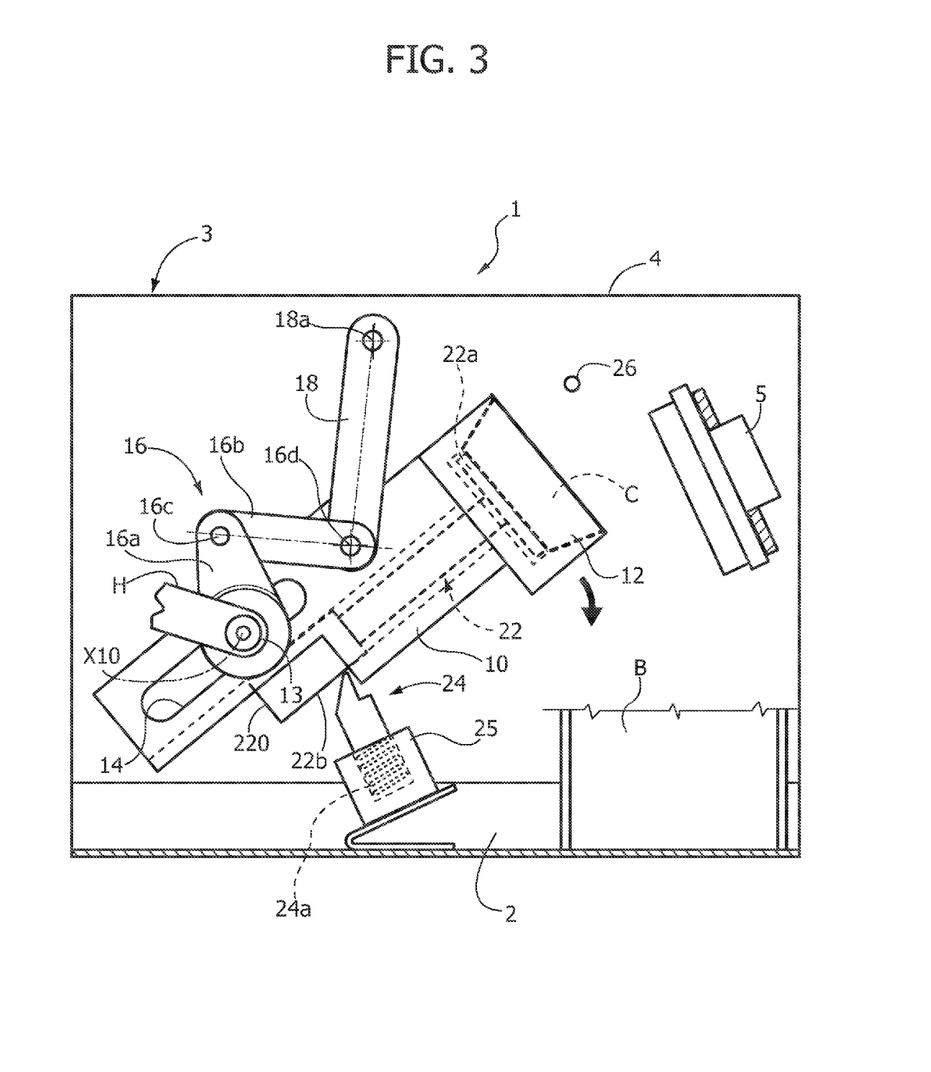
Figure 4:
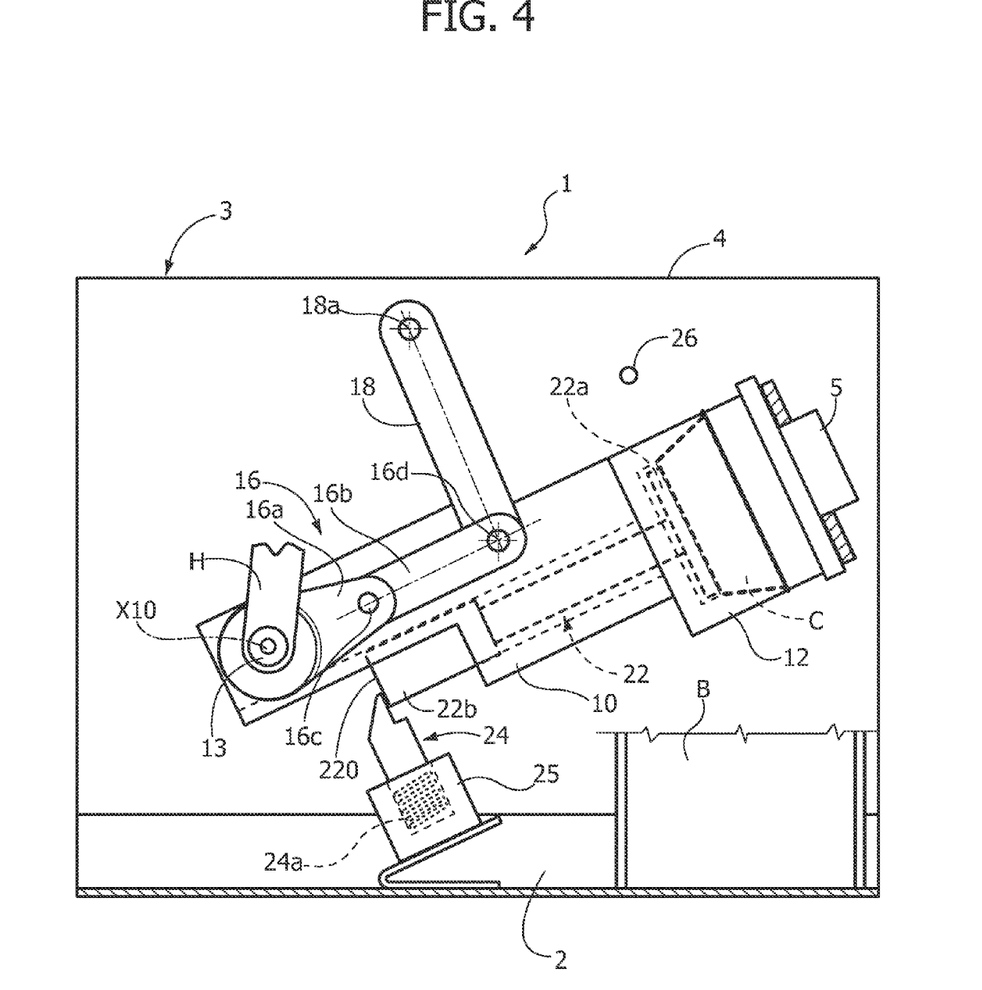
Figure 5:
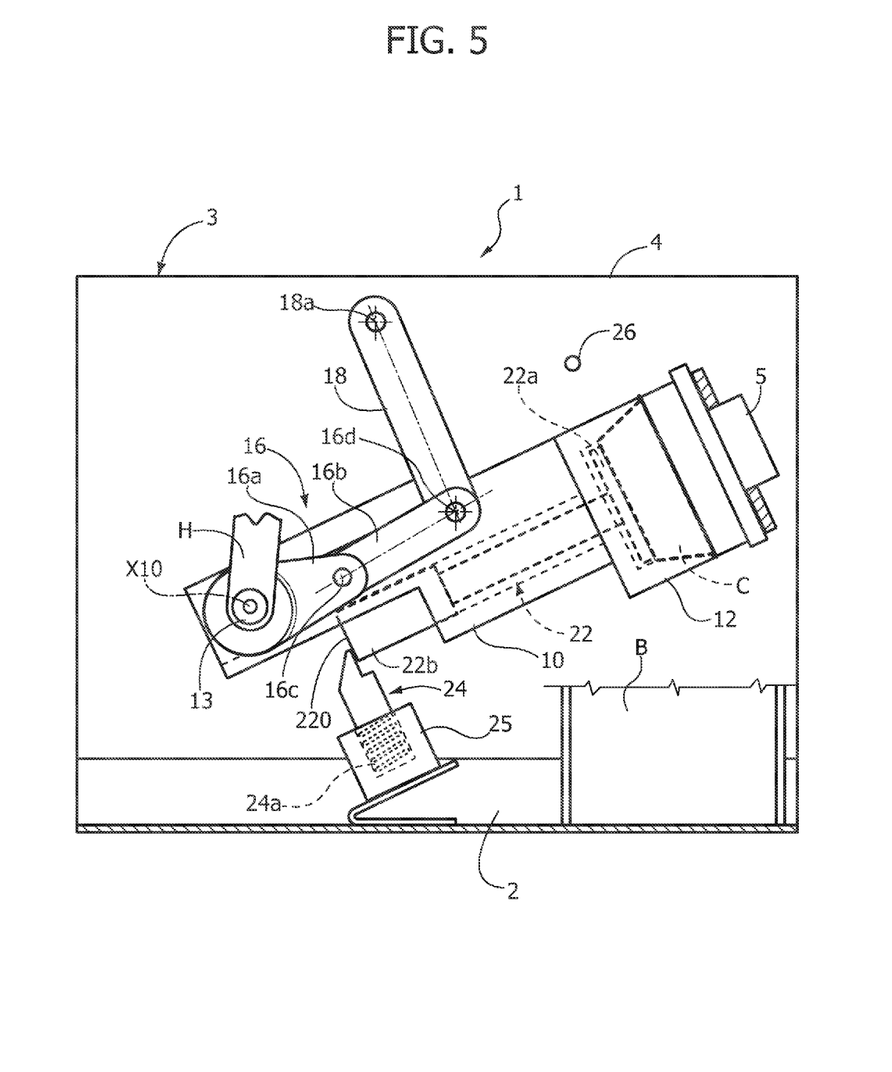
Figure 6:
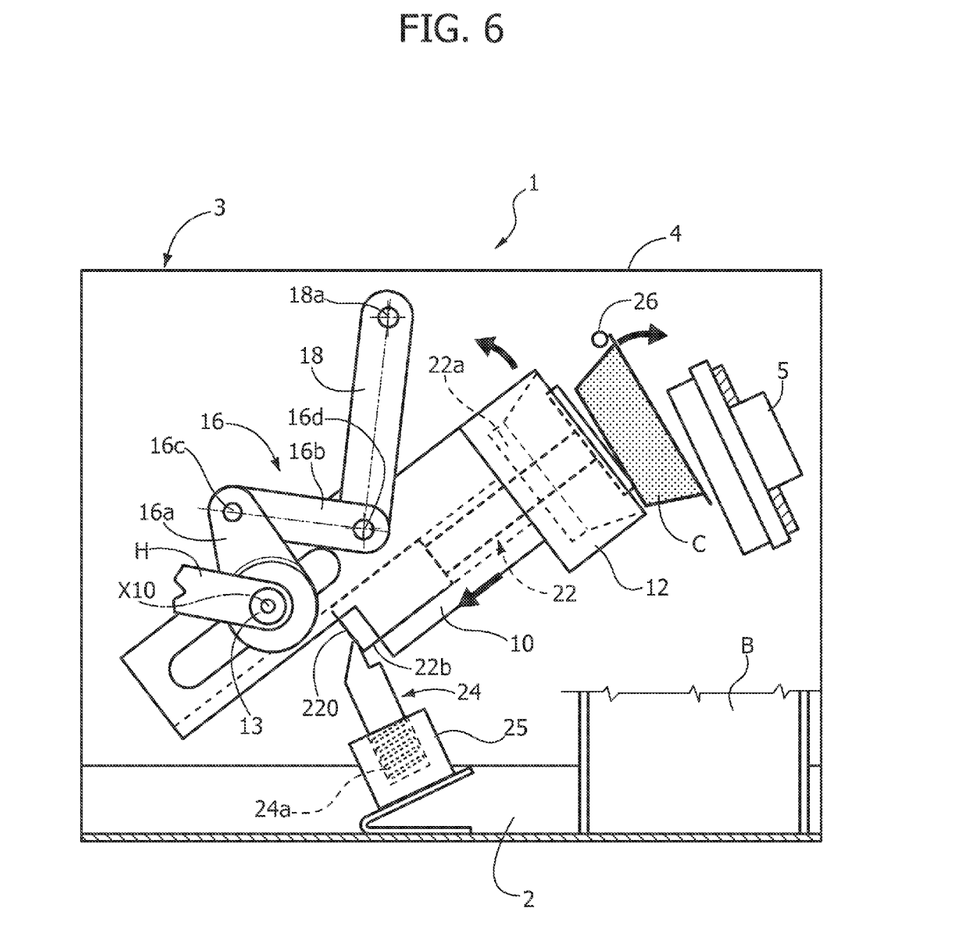

In the plates of figures, the sequence illustrated in FIGS. 2 to 4 (or 5) represents the movement of advance from the proximal position to the distal position, whereas the sequence illustrated in FIGS. 5 to 7 represents the movement of recession from the distal position to the proximal position.

Likewise, the sequence of FIGS. 2 to 4 (or 5) represents rotation of the moving element 10 between a first angular position (represented in FIG. 2) and a second angular position (represented in FIGS. 4 and 5). In a similar way, FIGS. 3 and 6 represent intermediate positions between the first angular position and the second angular position considered previously.

When the cartridge C is loaded into the portion 12 of the moving element 10, the moving element 10 is in a condition that may be defined as condition of loading of the cartridge, where the moving element 10 itself is located in the first angular position and in the proximal position set back. The moving element 10 again reaches said condition at the end of the cycle of operation, i.e., in the condition represented in FIG. 7, where the cartridge C previously used for preparing a beverage has been expelled from the portion 12.

FIG. 4 illustrates the moving element 10 in the condition of preparation of the beverage, i.e., in the condition where, in reaching the second angular position, so as to bring the cartridge C loaded in the portion 12 into front alignment with the assembly 5, the moving element 10 is also moved forward starting from its set back proximal position into its advanced distal position.

In this way, it may then be blocked (sequence of FIGS. 4 and 5) against the assembly 5 so as to ensure that the cartridge C will co-operate in conditions of tightness with the assembly 5 during preparation of the beverage, for example, by providing in the front part of the assembly 5 an annular gasket that is designed to co-operate with the peripheral rim of the top face of the cartridge C.

In various embodiments, the sequence of FIGS. 4 and 5 may correspond to the fact of bringing a toggle mechanism (more fully described in what follows) into a position of blocking of the cartridge C against the assembly 5. In various embodiments, said result may be achieved by resorting to equivalent means.

Consequently, for the purposes of the combined movement of rotation and translation of the moving element 10 as described herein, FIGS. 4 and 5 may be viewed as in effect coinciding with one another.

The movement of orientation of the moving element 10 between the first angular position (FIG. 2 and FIG. 7) and the second angular position (FIG. 4 and FIG. 5) passing (in opposite directions, in the two cases) into the intermediate angular positions schematically represented in FIG. 3 and in FIG. 6 is performed about an axis X10.

In various embodiments, said axis of angular orientation may take the form of a pin (or a pair of pins) 13 supported by one or both of the sides 4 of the frame 3 and able to extend through a groove or slit or slot 14 that extends in a generically axial direction with respect to the moving element 10, i.e., in alignment with the principal direction of extension of the moving element 10 itself.

The modalities of installation of the moving element 10 on the frame 3, such as to cause the moving element 10 to be supported on the frame 3 with the capacity of turning about the axis X10 between a first angular position and a second angular position, likewise having the possibility of translating between a proximal position set back and a distal position set forward may be implemented in various ways.

For example, it is possible to provide a pin or a pair of pins projecting from the moving element 10 and co-operating with capacity of rotation and sliding in slits or slots provided on the frame 3 (see, for example, the document No. EP-A-1 854 384 already cited previously).

Furthermore, the slit 14, here represented as a through slit that traverses the body of the moving element 10, might present in the form of a blind slit or of a pair of blind slits made on one side or on each side of the moving element 10, i.e., be replaced by a channel guide or a pair of channel guides mounted on one side or on each side of the moving element 10 and open towards the outside of the moving element 10 itself with the capacity of co-operating with pins carried by the frame 3. In a dual way, it might be the frame 3 that bears a blind slit or a pair of blind slits made on one side or on each side 4, i.e., be replaced by a channel guide or a pair of channel guides mounted on one side or on each side 4 of the frame 3 and open towards the outside of the moving element 10 itself with the capacity of co-operating with pins carried by the moving element 10.

Yet other solutions that may achieve the result of enabling the element to turn and translate with respect to the axis X10 can be defined by the person skilled in the sector and hence do not require a detailed description herein.

In various embodiments, the translational movement of advance-recession of the moving element 10 (from the set back proximal position to the advanced distal position, and vice versa, as described previously) may be obtained via a drive mechanism 16 substantially resembling a toggle mechanism.

In various embodiments, the aforesaid drive mechanism may include a first arm 16a and a second arm 16b.

The arm 16a may be hinged at the axis X10 (whatever the specific solution adopted to give concrete form to the axis X10) and may be governed in rotation about the axis X10 by a drive lever or handle H.

In various embodiments, the lever or handle H (represented only in part in FIGS. 2 to 7) may present a certain length so as to render driving of the mechanism more convenient.

In various embodiments, the lever or handle H may have a certain width and thus constitute an oscillating lid that may be tipped upwards to enable loading of the cartridge C therein (condition represented in FIG. 2) and then be lowered to bring the moving element 10 and the cartridge C into the condition of preparation of the beverage (FIGS. 4 and 5), also performing the role of lid for covering the assembly 5 and the cartridge C during preparation of the beverage. The foregoing with the possibility of then tipping the handle H once again upwards to govern expulsion of the used cartridge (FIG. 7) and enable loading of a new cartridge C therein (return into the condition represented in FIG. 2).

Figure 8:
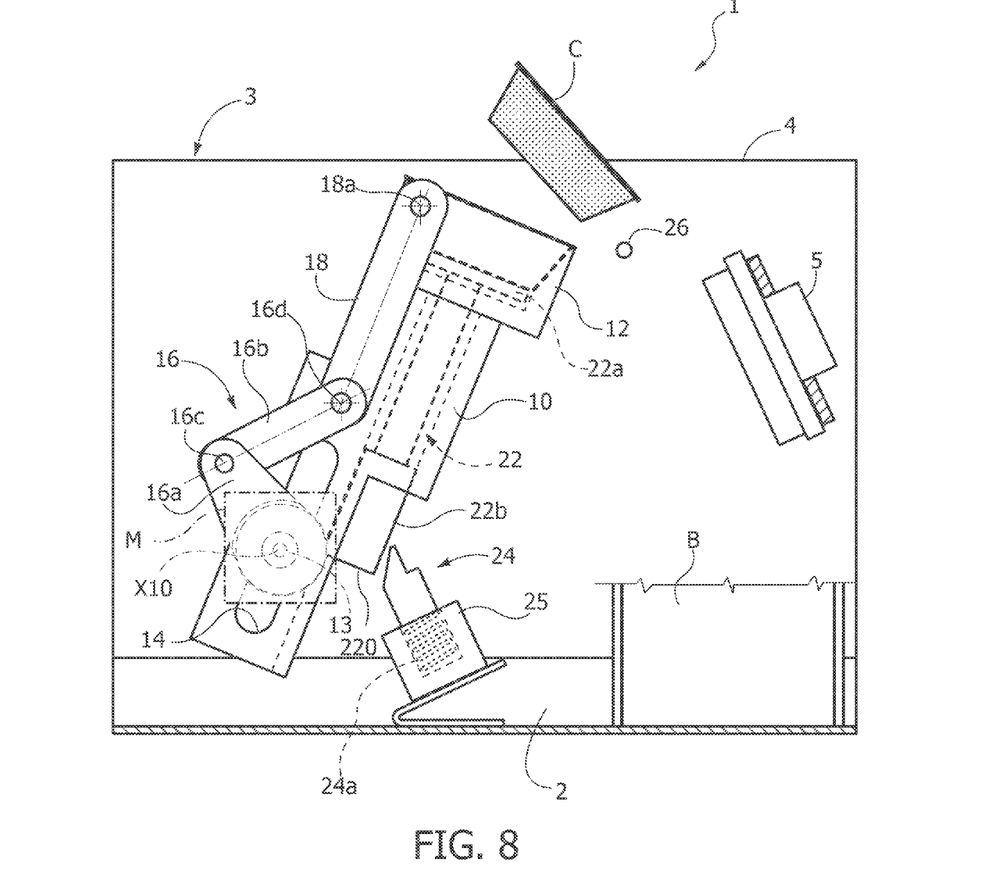

In various embodiments, the drive mechanism 16 may be moved, instead of in a manual way (for example, with the lever H exemplified here) by a motor M such as, for example, an electric motor acting, for example, on the pin 13. See FIG. 8.

In various embodiments, the pin 13 (or in general the mechanism 16) may be obtained with engagement formations that may be coupled either with a manual actuator (for example, the lever H) or with a motor-driven actuator (for example, an electric motor). This solution offers a good degree of flexibility in the production stage, in so far as it enables use of an identical mechanism both for manually driven machines, and for motor-driven machines.

In the exemplary embodiment considered here, the first arm 16a of the mechanism 16 is hinged in 16c to the second arm 16b, which in turn acts on the moving element 10 at a point designated by 16d.

Comparison between FIG. 1 and FIGS. 2 to 7 on the other hand enables realization of the fact that the mechanism 16 may in various embodiments be duplicated on the two sides of the moving element 10 so as to give rise to an overall and balanced structure.

Recourse to a mechanism that may be defined as a toggle mechanism (a solution that on the other hand is not imperative for the purposes of implementation of the invention) enables of an action of blocking of the cartridge C against the assembly 5 represented schematically in FIG. 5 to be performed. In particular, in various embodiments, said result may be achieved by causing, in the passage between the condition represented in FIG. 4 and the condition represented in FIG. 5, the mechanism 16 to pass beyond its dead centre (with the angle jointly defined by the arms 16a and 16b that initially is an acute angle, then becomes in FIG. 4 a flat angle, and then becomes an obtuse angle in the condition of FIG. 5).

Exceeding of the aforesaid condition of dead centre causes forces of reaction acting in the direction of pushing the cartridge C away from the assembly 5 to be in practice of no effect in so far as they act in the sense of forcing the toggle mechanism in the closing direction.

The reference 18 designates an oscillating arm (which may, in various embodiments, also be duplicated as a pair of localized arms each acting on one of the sides of the moving element 10), which acts as mechanical (or, more correctly, kinematic) constraint between the moving element 10 and the frame 3 so as to constrain to one another—i.e., render interdependent—movements of rotation and translation that the moving element 10 is able to perform with respect to the axis X10.

In various embodiments, the arm 18 or each arm 18 may be hinged, at one end, to the moving element 10 in a point 16d and, at the opposite end, to a point 18a, which defines an axis of oscillation of the arm 18 situated in a fixed position with respect to the frame 3.

In various embodiments, the arm 18 or each arm 18 may be hinged to the moving element 10 in a point located between the axis X10 and the distal cartridge-holder portion 12.

In various embodiments, the arm 18 or each arm 18 may be hinged to the moving element 10 at the same point 16d on which the distal end of the second arm 16b of the toggle mechanism 16 acts.

The various hinging axes considered here (for example 16c, 16d, 18a, etc.) may take the form of a pin carried by one of the hinged elements and passing in a hole provided in the other hinged element.

In various embodiments, the action of constraint of the moving element 10 to the frame or casing 3 performed, in the embodiments considered herein, by the arm or arms 18 may be obtained with equivalent means.

For example, in various embodiments it is possible to resort to a channel or a slit with an arched profile provided in the frame 3 and in which a pin projecting from the moving element 10 slidingly engages, or else, in a dual way, to provide on the moving element 10 a channel or slit in which a pin projecting from the frame 3 slidingly engages; if need be, both of said solutions may be duplicated symmetrically on the two sides of the moving element 10.

Yet other solutions that are able to achieve the result of rendering the movements of rotation and translation of the moving element 10 with respect to the axis X10 interdependent can be defined by the person skilled in the sector and hence do not require a detailed description herein.

In various embodiments, recourse to an oscillating-arm mechanism (as represented in the figures) enables creation of a mechanism of single constraint, intrinsically with low friction, which is able to guide the moving element 10 in the combined movement of rotation and translation represented in FIGS. 2 to 7.

However implemented, in various embodiments, the aforesaid action of constraint of the moving element 10 to the frame or casing 3 may have the effect of coupling the movements of rotation and translation of the body 10 with respect to the axis X10 to one another and of causing the aforesaid movements to be coupled and hence linked to one another.

In this way, as may be appreciated, for example, considering the sequence of FIGS. 2 to 4, when the mechanism 16 is actuated, for example by lowering the handle/lid H, to cause advance of the moving element 10 from the set back (proximal) position of FIG. 2 to the set forward (distal) position of FIG. 4, the presence of the arm or arms 18 causes the moving element 10 to pass simultaneously from the first angular position represented in FIG. 2 to the second angular position represented in FIG. 4.

In a dual way, considering, for example, the sequence of FIGS. 5 to 7 (as already mentioned, FIG. 4 and FIG. 5 may be considered identical to one another), when the mechanism 16 is actuated, for example by raising the handle/lid H, to cause return of the moving element 10 from the advanced (distal) position of FIG. 4 or 5 to the set back (proximal) position of FIG. 7, the presence of the arm or arms 18 simultaneously causes the moving element 10 to return also from the second angular position represented in FIGS. 4 and 5 to the first angular position represented in FIG. 7 (and in FIG. 2).

In various embodiments, it is possible to select the positions of hinging of the arm or arms 18 in such a way that in the condition of FIGS. 4 and 5 the arm or arms 18 are arranged substantially orthogonal to the direction of greater extension of the moving element 10. In this way, it is possible to cause an even very slight translation of the moving element 10 as it passes between the condition represented in FIG. 4 and the condition represented in FIG. 5 not to cause any lateral translation of the cartridge C with respect to the assembly 5.

In this regard, it is recalled that, since it is possible to achieve the tightness of the cartridge C against the assembly 5 also with means different from the ones previously considered (for example, with a blocking mechanism, not illustrated) the passage from the position represented in FIG. 4 to the position represented in FIG. 5 may be omitted with return to the position of loading of the cartridge (FIG. 7) reached directly starting from the condition represented in FIG. 4. For what concerns us here, FIG. 4 and FIG. 5 may hence be considered identical.

It will likewise be appreciated that the examplary embodiment considered here envisages that the drive mechanism of the moving element 10 (here represented by the mechanism 16) will act in the sense of producing basically the movement of translation of the moving element 10 and, consequently, thanks to the constraint to the frame 3 exemplified here by the arm or arms 18, the movement of rotation of the moving element 10 itself about the axis X10.

In various embodiments, coupling between the two movements exemplified here by the arm or arms 18 might be used in the opposite direction, i.e., by providing a drive mechanism that acts on the moving element 10 governing rotation thereof about the axis X10 and bringing about, once again as a result of the constraint exemplified here by the arm or arms 18, the corresponding movement of translation.

Again, in various embodiments, it is possible to envisage a drive mechanism such as to induce in the moving element 10 a movement both of rotation and of translation, the coupling between the two movements ensured by the constraint exemplified here by the arm or arms 18 causing the two movements (rotation and translation with respect to the axis X10) to be coupled to one another.

On the other hand, it will moreover be appreciated that, in various embodiments, the drive mechanism exemplified here in a way distinct from the mechanism 16 might in effect be incorporated in other elements of the solution here considered.

For example, in various embodiments, the drive mechanism 16 here exemplified might be altogether eliminated, envisaging that the movement of the cartridge-holder moving element 10 with respect to the frame between the condition of loading of the cartridge (first angular position of rotation and proximal position of translation) and the condition of preparation of the beverage (second angular position of rotation and distal position of translation) will be governed, for example, by the arm or arms 18, which are in turn moved manually (for example, with a lever like the lever H) or motor-driven, or else driven by a motor member (either manual or motor-driven) acting in some other way on the moving element 10.

In the case of the constraint exemplified here by the arm or arms 18, the point of hinging to the moving element 10 (here exemplified by the point 16d) follows an arched path with constant radius, hence corresponding to an arc of circumference.

By resorting to a constraint/coupling mechanism of a different type (for example, with a pin or pins projecting from the moving element 10—respectively, from the frame 3—and engaging like a cam follower a slit or channel guide carried by the frame 3—respectively, by the moving element 10) it is possible to impart to the point of constraint on the moving element 10 (i.e., at a point that may be considered equivalent to the point 16d of the annexed figures) also a path of a different type, for example a path of a parabolic type.

In this case, in various embodiments, the distal stretch (corresponding to approach of the cartridge C to the assembly 5) of said path might be used by exerting the action of forcing achieved, in the example of embodiment illustrated here, by bringing the toggle mechanism 16 beyond its dead centre (FIGS. 4 and 5).

Whatever the specific embodiment adopted, the result achieved is that the displacement of the moving element 10 that is to bring the cartridge C between the condition of loading represented in FIG. 2 (first angular position and set-back position) to the condition of preparation of the beverage (second angular position and distal position of FIGS. 4 and 5), and vice versa, is obtained via mutually coupled movements of rotation and translation in so far as the moving element 10 is constrained to the frame 3. Said movements are consequently performed simultaneously, avoiding the drawbacks that may arise in those solutions in which similar movements of rotation and translation are performed in subsequent moments, with possible discontinuities.

The reference number 22 designates an element for expelling the cartridge C, which may comprise, for example, an expelling plunger with a head part 22a and a stem part 22b according to a general mushroom conformation.

For example, in various embodiments, the head part 22a may be obtained in the form of a cup, which, when the cartridge C is loaded into the portion 12 of the moving element 10 (FIG. 2), is set back, i.e., lowered in a position corresponding to the bottom wall of the cavity for receiving the cartridge C, which, in various embodiments, may present a general tray-like configuration.

In said conditions, the stem part 22b is set back (hence located in a respective proximal position) with respect to the moving element 10: see, for example, once again FIG. 2.

Finally, the reference number 24 designates a sort of engagement tooth or trigger mounted on the frame 3 so as to be able to co-operate with the expeller element 22, for example with the stem part 22b thereof.

For instance, in various embodiments, the stem 22b may be obtained in such a way that when the head part 22a is located in the bottom position of the portion 12 so as not to hinder insertion of the cartridge C in the portion 12 of the moving element 10 (see FIG. 2, for example), the stem 22b has an end position 220 that emerges on the outside of the moving element 10, projecting beyond the tooth or trigger 24.

As exemplified more fully in FIG. 3, during the combined movement of rotation and translation between the position of loading of the cartridge C and the position of preparation of the beverage, the trigger 24 does not interfere with the expeller element 22.

For instance, in various embodiments, this result may be obtained by causing the trigger 24 to be inserted in a support 25 carried by the frame 3 in such a way as to be able to recede compliantly, for example against the action of the return spring 24a, for example a helical spring, which acts in the direction of pushing the trigger 24 towards the moving element 10 and the expeller element 22.

In this way, when the expeller element 22 comes into contact with the trigger 24 (owing to the fact that the moving element 10 advances and rotates from the condition of FIG. 2 to the condition of FIGS. 4 and 5), the expeller element itself moves the trigger (for example, pushing it backwards, within the support 25, against the force of the spring 24a, which yields elastically).

In such conditions, the stem 22b slides against the trigger 24, but, as may be seen in FIG. 4, when the element has reached the condition of preparation of the beverage, the spring 24a triggers the trigger 24 "behind" the expeller element 22.

Consequently, when the moving element 10 is made to translate and rotate backwards starting from the condition of preparation of the beverage, the trigger 24 interferes with the expeller element 22, for example by engaging the stem 22b at the end 220 and preventing recession thereof.

The compliant mounting of the element 22 on the moving element 10, which continues to recede, consequently produces an advance of the expeller element 22 with respect to the moving element 10 with the result that the head part 22a advances (i.e., is raised) within the portion 12 (see, for example, FIG. 1 and FIG. 6), bringing about expulsion of the cartridge C used for preparing a beverage.

In returning towards the condition represented in FIG. 7, the portion 12 is then released from the cartridge C previously inserted therein: the expelled cartridge then drops down, for example into a collection reservoir B.

The sequence of FIGS. 6 and 7 likewise makes it possible to realize the fact that, proceeding in its movement of rotation towards the first angular position of FIG. 7 (and of FIG. 2), the moving element 10 finally brings the expeller element 22 to disengage from the trigger 24.

The expeller element 22 is hence in a condition to return (for example, under the action of a return spring, not visible in the drawings) towards the set back position in which the head part 22a returns into the bottom part of the portion 12 in such a way as not to interfere with loading of a new cartridge C into the portion 12 itself.

The reference 26 designates a projecting formation, for example a pin mounted on the frame 3, situated adjacent to the module 5 in a position chosen (according to the dimensions and geometry of the various other elements described and represented herein) in such a way as to be approximately tangential to the path described by the distal end of the moving element 10 when the latter is located in the angular position corresponding to the conditions in which the head part 22a of the expeller 22 starts to expel the cartridge C from the portion 12.

In this way, the formation 26 is located in a position of contrast or interference with the path described by the cartridge C that is expelled from the portion 12. Since the formation 26 is in a fixed position (in so far as it is carried by the frame 3), whilst the cartridge C in the course of expulsion is drawn along by the distal portion 12 of the moving element 10 that is moving, the cartridge C ends up bumping against the formation 26. The formation 26 prevents the cartridge C from following the moving element 10 any further in its movement of return towards the position of FIG. 7 and facilitates, rendering it practically certain, expulsion of the cartridge C also in the case where the latter were to be accidentally withheld in the portion 12 by phenomena of sticking or shape fit, for example consequent upon the heating and pressurization to which the cartridge C is subjected during the preparation of the beverage.

In various embodiments, the presence of the expeller 22 (and the presence of the extraction formation 26) may represent purely optional characteristics since it is possible to provide a different mechanism of extraction of the cartridge C.

Of course, without prejudice to the principle of the invention, the details of construction and the embodiments may vary, even significantly, with respect to what is illustrated herein purely by way of non-limiting example, without thereby departing from the extent of protection of the invention, said extent of protection being defined by the annexed claims.

The invention claimed is:

1. A device for preparing beverages by means of a substance contained in a capsule, the device including:
    a support structure,
    a capsule holder body having a distal capsule holder portion, said body being supported on said support structure for rotation about an axis between a first angular position and a second angular position and for translation with respect to said axis between a proximal position and a distal position,
    wherein said capsule holder body is actuatable in motion with respect to said support structure between a capsule loading condition, wherein said capsule holder body is in said first angular position of rotation and in said proximal position of translation, and a beverage preparation condition, wherein said capsule holder body is in said second angular position of rotation and in said distal position of translation,
    wherein the device includes a mechanical link linking said capsule holder body and said support structure, whereby said capsule holder body is actuatable in motion between said capsule loading condition and said beverage preparation condition by simultaneous rotation and translation movements with respect to said axis, wherein said link includes at least one swinging arm hinged to said supporting structure and said capsule holder body, and wherein said swinging arm is hinged to said capsule holder body at a point which is actuated upon by an actuating mechanism to move said capsule holder body with respect to said support structure, and wherein the device further includes an actuating mechanism to move said capsule holder body between said capsule loading condition and said beverage preparation condition, wherein said actuating mechanism is driven by an actuating lever rotatable around said axis, wherein said actuating lever forms a cover to conceal said capsule holder portion in said beverage preparation condition.

2. The device of claim 1, wherein said link is at a point between said axis and said distal capsule holder portion.

3. The device of claim 1, wherein the actuating mechanism acts between said axis and said capsule holder body to move said capsule holder body between said capsule loading condition and said beverage preparation condition.

4. The device of claim 3, wherein the actuating mechanism is a knuckle joint mechanism.

5. A device for preparing beverages by means of a substance contained in a capsule, the device including:
   a support structure,
   a capsule holder body having a distal capsule holder portion, said body being supported on said support structure for rotation about an axis between a first angular position and a second angular position and for translation with respect to said axis between a proximal position and a distal position,
      wherein said capsule holder body is actuatable in motion with respect to said support structure between a capsule loading condition, wherein said capsule holder body is in said first angular position of rotation and in said proximal position of translation, and a beverage preparation condition, wherein said capsule holder body is in said second angular position of rotation and in said distal position of translation,
   wherein the device includes a mechanical link linking said capsule holder body and said support structure, whereby said capsule holder body is actuatable in motion between said capsule loading condition and said beverage preparation condition by simultaneous rotation and translation movements with respect to said axis,
   a capsule ejector acting on said distal capsule holder portion, said ejector having a drive shank adapted to slide distally of that capsule holder body to eject a capsule from said capsule holder portion, and
   a toggle element capable of acting on said drive shank to prevent movement thereof together with said capsule holder body from said beverage preparation condition to said capsule loading condition, whereby said drive shank slides distally of said capsule holder body with an ensuing capsule ejection from said capsule holder portion.

6. The device of claim 5, wherein said toggle element includes a trigger resiliently yielding under the action of said drive shank as said capsule holder body is moved from said capsule loading condition to said beverage preparation condition.

7. The device of claim 5, including, mounted on said support structure, a stop formation located adjacent the trajectory described by said distal capsule holder portion of said capsule holder body leaving said beverage preparation condition to return to said capsule loading condition, whereby said stop formation interferes with a capsule being ejected from the said capsule holder portion by said ejector to prevent dragging of said capsule being ejected from said capsule holder body.

8. A device for preparing beverages by means of a substance contained in a capsule, the device including:
   a support structure,
   a capsule holder body having a distal capsule holder portion, said body being supported on said support structure for rotation about an axis between a first angular position and a second angular position and for translation with respect to said axis between a proximal position and a distal position,
   wherein said capsule holder body is actuatable in motion with respect to said support structure between a capsule loading condition, wherein said capsule holder body is in said first angular position of rotation and in said proximal position of translation, and a beverage preparation condition, wherein said capsule holder body is in said second angular position of rotation and in said distal position of translation,
   wherein the device includes a mechanical link linking said capsule holder body and said support structure, whereby said capsule holder body is actuatable in motion between said capsule loading condition and said beverage preparation condition by simultaneous rotation and translation movements with respect to said axis,
   wherein said support structure includes a pin to support said capsule holder body for rotation and translation with respect to said axis, and
   wherein said capsule holder body includes a slide formation extending lengthwise of said capsule holder body and cooperating with said pin with rotation and sliding capability.

9. The device of claim 8, wherein the slide formation is in the form of a slot.

* * * * *